US011782371B2

(12) United States Patent
Lee et al.

(10) Patent No.: US 11,782,371 B2
(45) Date of Patent: Oct. 10, 2023

(54) FIXING BELT WITH HIGH THERMAL CONDUCTIVITY

(71) Applicant: HEWLETT-PACKARD DEVELOPMENT COMPANY, L.P., Spring, TX (US)

(72) Inventors: Sunhyung Lee, Yongin-si (KR); Sungwoo Kang, Suwon-si (KR)

(73) Assignee: Hewlett-Packard Development Company, L.P., Spring, TX (US)

( * ) Notice: Subject to any disclaimer, the term of this patent is extended or adjusted under 35 U.S.C. 154(b) by 407 days.

(21) Appl. No.: 17/282,940

(22) PCT Filed: Sep. 19, 2019

(86) PCT No.: PCT/US2019/051935
§ 371 (c)(1),
(2) Date: Apr. 5, 2021

(87) PCT Pub. No.: WO2020/096699
PCT Pub. Date: May 14, 2020

(65) Prior Publication Data
US 2021/0373473 A1    Dec. 2, 2021

(30) Foreign Application Priority Data

Nov. 7, 2018   (KR) .................. 10-2018-0136062

(51) Int. Cl.
*G03G 15/20* (2006.01)
*C08K 3/04* (2006.01)
(Continued)

(52) U.S. Cl.
CPC ......... *G03G 15/2057* (2013.01); *C08K 3/041* (2017.05); *C08K 3/042* (2017.05); *C08K 3/38* (2013.01); *C08K 7/04* (2013.01); *C08L 27/18* (2013.01); *C08L 79/08* (2013.01); *C08K 2003/385* (2013.01); *G03G 2215/2035* (2013.01); *G03G 2215/2048* (2013.01)

(58) Field of Classification Search
CPC .......................... G03G 15/0257; G03G 15/20
USPC ................ 399/122, 320, 328, 329, 330, 333
See application file for complete search history.

(56) References Cited

U.S. PATENT DOCUMENTS 6,376,033 B1    4/2002  Sonobe et al.
2009/0324959 A1  12/2009 Wu
(Continued)

FOREIGN PATENT DOCUMENTS

CN    101910957 B    12/2010
CN    105988344    * 10/2016
(Continued)

*Primary Examiner* — Hoan H Tran
(74) *Attorney, Agent, or Firm* — Foley & Lardner LLP (57) ABSTRACT

A fixing belt includes a substrate layer inducting a first base resin and a first thermally conductive filler dispersed in the first base resin; and a release layer provided on the substrate layer, wherein the first base resin includes at least one selected from a polyimide, a polyamide, and a polyamide-imide and the first thermally conductive filler includes at least one selected from carbon black, graphite, boron nitride (BN), carbon nanotubes (CNTs), and carbon fibers, and the substrate layer has a thermal conductivity in a thickness direction of about 1.5 W/m·K or more.

15 Claims, 5 Drawing Sheets

(51) Int. Cl.
*C08K 3/38* (2006.01)
*C08K 7/04* (2006.01)
*C08L 27/18* (2006.01)
*C08L 79/08* (2006.01)

(56) References Cited

U.S. PATENT DOCUMENTS

2010/0055365 A1 3/2010 Nakajima et al.
2012/0170958 A1 7/2012 Nakajima et al.
2013/0251425 A1 9/2013 Son et al.
2014/0348559 A1 11/2014 Miyahara

FOREIGN PATENT DOCUMENTS

| JP | 2002268423 A | | 9/2002 |
|----|--------------|---|--------|
| JP | 2011002658 A | | 1/2011 |
| JP | 2018028658 | * | 2/2018 |

* cited by examiner

FIXING BELT WITH HIGH THERMAL CONDUCTIVITY

CROSS REFERENCE TO RELATED APPLICATIONS

This application is filed under 35 U.S.C. § 371 as a National Stage of PCT International Application No. PCT/US2019/051935, filed on Sep. 19, 2019, in the U.S. Patent and Trademark Office, which claims the priority benefit of Korean Patent Application No. 10-2018-0136062 filed on Nov. 7, 2018, in the Korean Patent Office. The disclosures of PCT International Application No. PCT/US2019/051935 and Korean Patent Application No. 10-2018-0136062 are incorporated by reference herein in their entireties.

BACKGROUND

In electrophotographic imaging apparatuses such as facsimile machines, printers, copy machines, and the like, toner is supplied to an electrostatic latent image formed on an image receptor to form a visible toner image on the image receptor, the toner image is transferred onto a recording medium, and then the transferred toner image is fixed on the recording medium.

A fixing process includes a process of applying heat and pressure to toner. Generally, a fixing device includes a heating roller and a pressing roller that are engaged with each other to form a fixing nip. The heating roller is heated by a heater such as a halogen lamp or the like. The recording medium to which the toner image has been transferred is subjected to heat and pressure while passing through the fixing nip, and the toner image is fixed on the recording medium.

DETAILED DESCRIPTION

For high-speed printing and low-energy fixing, a fixing belt having a relatively small heat capacity as compared to that of the heating roller may be used. As the heater, a plate heater for locally heating the fixing belt in the fixing nip may be employed.

To be efficiently used in high-speed printing and high-energy fixing methods, the fixing belt is to have crack resistance and high thermal conductivity.

Hereinafter, a fixing belt according to some examples of the disclosure, and a fixing device and an electrophotographic imaging apparatus each employing the same will be described.

Figure 1:
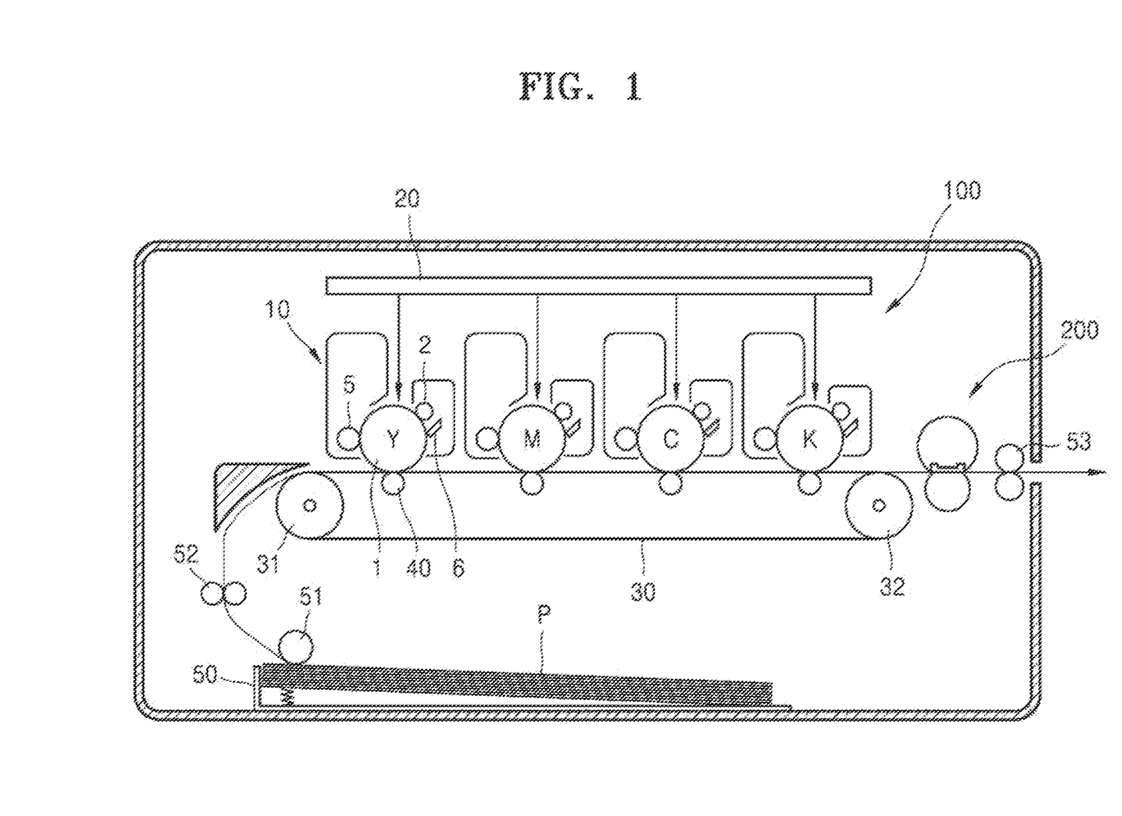
FIG. 1 is a schematic configuration view of an electrophotographic imaging apparatus according to an example of the disclosure.

FIG. 1 is a schematic configuration view of an electrophotographic imaging apparatus according to an example of the disclosure. Referring to FIG. 1, the electrophotographic imaging apparatus, for example, a printer may include: a printing unit 100 configured to form a visible toner image on a recording medium P, for example, paper; and a fixing device 200 configured to fix the toner image on the recording medium P. In the example, the printing unit 100 may form a color toner image electrophotographically.

The printing unit 100 may include a plurality of photosensitive drums 1, a plurality of developing devices 10, and a paper transfer belt 30. The photosensitive drum 1 is an example of a photoconductor on which an electrostatic latent image is formed, and may include a conductive metal pipe and a photosensitive layer formed on an outer circumferential surface thereof. The developing devices 10 respectively correspond to the photosensitive drums 1, and each developing device 10 supplies toner to the electrostatic latent image formed on each photosensitive drum 1 and develops the latent image to form a toner image on a surface of each photosensitive drum 1. Each of the developing devices 10 may be replaced independently of the photosensitive drums 1. In addition, each developing device 10 may be in the form of a cartridge including the photosensitive drum 1.

For color printing, the developing devices 10 may include a plurality of developing devices 10Y, 10M, 10C, and 10K configured to receive toner of yellow (Y), magenta (M), cyan (C), and black (K) colors, respectively. The developing devices 10 may further include developing devices configured to receive toner of various colors such as light magenta, white, and the like in addition to the above-described colors. Hereinafter, an imaging apparatus including the developing devices 10Y, 10M, 10C, and 10K will be described. Unless otherwise specified, reference numerals with Y, M, C, or K respectively denote components for printing images by using toner of yellow (Y), magenta (M), cyan (C), and black (K) colors.

The developing device 10 supplies toner accommodated therein to an electrostatic latent image formed on the photosensitive drum 1 and develops the electrostatic latent image into a visible toner image. The developing device 10 may include a developing roller 5. The developing roller 5 supplies toner in the developing device 10 to the photosensitive drum 1. A developing bias voltage may be applied to the developing roller 5. A regulating member (not shown) restricts the amount of toner that is supplied by the developing roller 5 to a developing region where the photosensitive drum 1 and the developing roller 5 face each other.

In the case of a two-component developing method, magnetic carrier and toner may be accommodated in the developing device 10. The developing roller 5 may be spaced apart from the photosensitive drum 1 by tens to hundreds of microns. Although not illustrated in the drawing, the developing roller 5 may include a magnetic roller arranged in a hollow cylindrical sleeve. Toner is attached to a surface of the magnetic carrier. The magnetic carrier is attached to the surface of the developing roller 5 and transported to the developing region where the photosensitive drum 1 and the developing roller 5 face each other. Only the toner is supplied to the photosensitive drum 1 by the developing bias voltage applied between the developing roller 5 and the photosensitive drum 1, and thus the electrostatic latent image formed at the surface of the photosensitive drum 1 is developed into a visible toner image. The developing device 10 may include an agitator (not shown) that mixes and agitates toner with magnetic carrier and transport the resulting mixture to the developing roller 5. The agitator may be, for example, an auger, and the developing device 10 may be provided with a plurality of agitators.

In the case of a one-component developing method that does not use carrier, the developing roller 5 may be rotated while being in contact with the photosensitive drum 1. The developing roller 5 may also be rotated while being spaced apart from the photosensitive drum 1 by tens to hundreds of microns. The developing device 10 may further include a supply roller (not shown) configured to attach toner to the surface of the developing roller 5. A supply bias voltage may be applied to the supply roller. The developing device 10 may further include an agitator (not shown). The agitator may agitate toner to be fractionally charged. The agitator may be, for example, an auger.

A charging roller 2 is an example of a charger configured to charge the photosensitive drum 1 to have a uniform surface potential. A charging brush, a corona charger, or the like may be used instead of the charging roller 2.

A cleaning blade 6 is an example of a cleaning device configured to remove toner and impurities remaining on the surface of the photosensitive drum 1. Other forms of cleaning devices such as a rotary brush, and the like may also be used instead of the cleaning blade 6.

An example of a developing method of the electrophotographic imaging apparatus according to an example of the disclosure will be described in detail. However, the disclosure is not limited thereto, and various developing methods may be employed.

An exposer 20 emits light modulated to correspond to image information to photosensitive drums 1Y, 1M, 1C, and 1K to form electrostatic latent images corresponding to images of yellow (Y), magenta (M), cyan (C), and black (K) colors on the photosensitive drums 1Y, 1M, 1C, and 1K, respectively. As the exposer 20, a laser scanning unit (LSU) using a laser diode as a light source or a light emitting diode (LED) exposer using an LED as a light source may be used.

The paper transfer belt 30 supports and transfers the recording medium P. The paper transfer belt 30 may be supported by, for example, support rollers 31 and 32 and circulate. The recording medium P may be picked up one by one from a loading frame 50 by a pickup roller 51, transported by a transporting roller 52, and then attached to the paper transfer belt 30, for example, by an electrostatic force. A plurality of transfer rollers 40 may be arranged at positions facing the photosensitive drums 1Y, 1M, 1C, and 1K, with the paper transfer belt 30 arranged between the transfer rollers 40 and the photosensitive drums 1Y, 1M, 1C, and 1K. The transfer rollers 40 are an example of transfer devices that transfer the toner images from the photosensitive drums 1Y, 1M, 1C, and 1K to the recording medium P supported by the paper transfer belt 30. A transfer bias voltage is applied to the transfer rollers 40 to transfer the toner images to the recording medium P. A corona transfer unit or a pin scorotron-type transfer unit may be employed instead of the transfer roller 40.

The fixing device 200 may apply heat and/or pressure to the image transferred to the recording medium P to fix the transferred image to the recording medium P. The recording medium P having passed through the fixing device 200 is discharged by a discharge roller 53.

By the above configuration, the exposer 20 forms electrostatic latent images by irradiating the photosensitive drums 1Y, 1M, 1C, and 1K with a plurality of light beams modulated to correspond to image information of respective colors. The developing devices 10Y, 10M, 10C, and 10K form visible toner images of Y, M, C, and K colors at surfaces of the photosensitive drums 1Y, 1M, 1C, and 1K, respectively by respectively supplying toners of the Y, M, C, and K colors to the electrostatic latent images formed on the photosensitive drums 1Y, 1M, 1C, and 1K. The recording medium P loaded on the loading frame 50 is supplied to the paper transfer belt 30 by the pickup roller 51 and the transporting roller 52, and is held on the paper transfer belt 30, for example, by an electrostatic force. The toner images of Y, M, C, and K colors are sequentially transferred onto the recording medium P transported by the paper transfer belt 30, by the transfer bias voltage applied to the transfer rollers 40. When the recording medium P passes through the fixing device 200, the toner image is fixed on the recording medium P by heat and pressure. The recording medium P, on which the fixing process has been completed, is discharged by the discharge roller 53.

Although the imaging apparatus illustrated in FIG. 1 employs a method of directly transferring the toner images formed on the photosensitive drums 1Y, 1M, 1C, and 1K to the recording medium P supported by the paper transfer belt 30, other transferring methods may also be used. For example, a method of intermediately transferring the toner images developed on the photosensitive drums 1Y, 1M, 1C, and 1K to an intermedium transfer belt (not shown), and then transferring the transferred images to the recording medium P may also be employed.

In the case of printing a monochromic image, for example, an image of black color, the imaging apparatus may include the developing device 10K among the developing devices 10Y, 10M, 10C, and 10K. The paper transfer belt 30 does not need to be arranged. The recording medium P is transported between the photosensitive drum 1K and the transfer roller 40, and the toner image formed on the photosensitive drum 1K may be transferred to the recording medium P by the transfer bias voltage applied to the transfer roller 40.

The fixing device 200 applies heat and pressure to the toner image to fix the toner image on the recording medium P. To improve a printing speed and reduce energy consumption, a portion to be heated of the fixing device 200 may have a smaller thermal capacity. For example, the fixing device 200 including a thin film-type endless belt as the portion to be heated may be employed. Thus, the temperature of the fixing device 200 may be rapidly increased up to a fixable temperature, and a state in which image formation is possible after the imaging apparatus is powered on may be reached within a short period of time.

Figure 2:
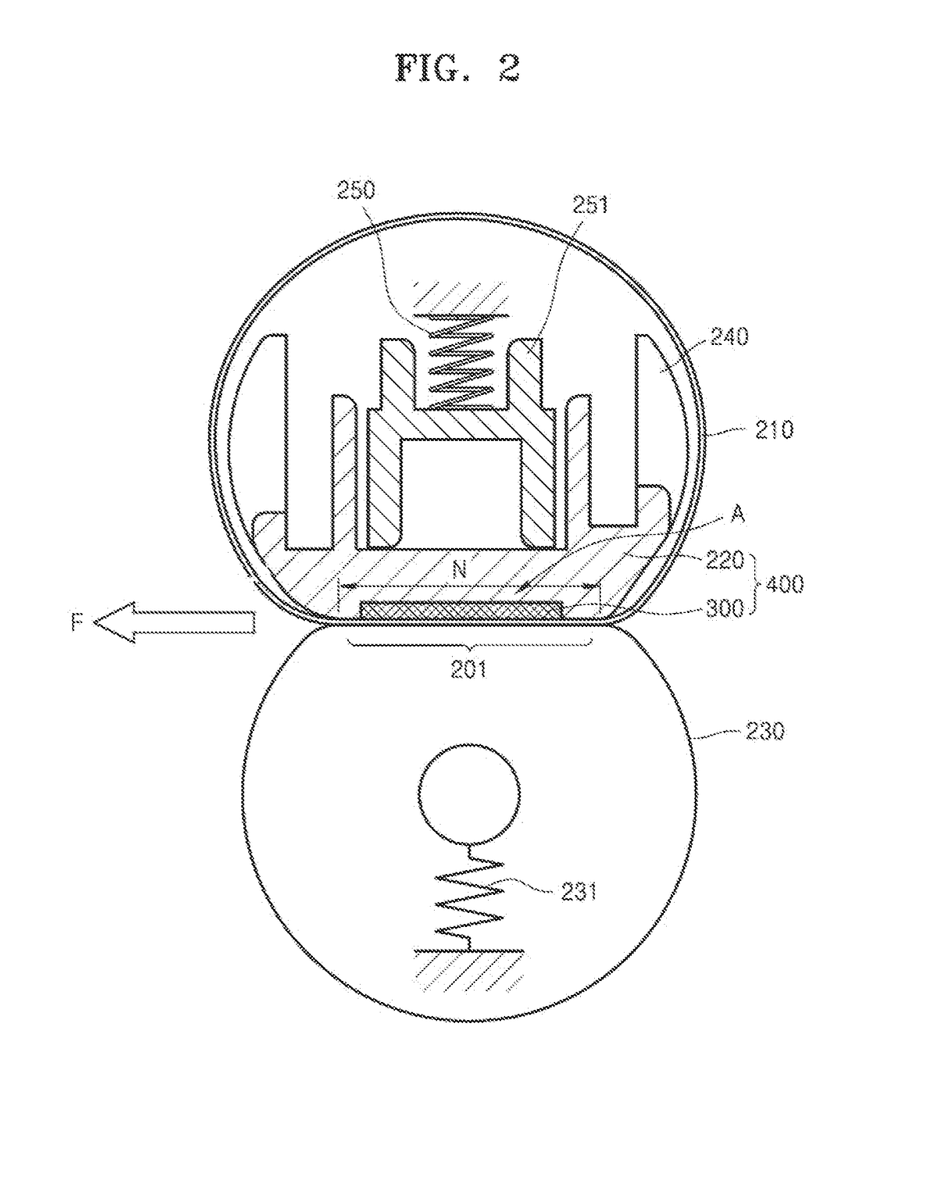
FIG. 2 is a cross-sectional view of a fixing device according to an example of the disclosure, which may be installed in the electrophotographic imaging apparatus of FIG. 1.

FIG. 2 is a cross-sectional view of the fixing device 200 according to an example of the disclosure, which may be installed in the electrophotographic imaging apparatus of FIG. 1.

Referring to FIG. 2, the fixing device 200 includes a rotatable endless belt 210, a heating unit 400 provided inside the endless belt 210, and a backup member 230 provided opposite to the heating unit 400, outside the endless belt 210 to form a fixing nip 201. The backup member 230 may be, for example, a backup roller, i.e., a pressing roller, and may be arranged to be in contact with the heating unit 400 with the endless belt 210 therebetween such that the backup member 230 and the heating unit 400 rotate while pressing against each other, thereby driving the endless belt 210. The heating unit 400 is provided inside the endless belt 210, provided opposite to the backup member 230 to form the fixing nip 201, and heats the endless belt 210 in the fixing nip 201.

The heating unit 400 includes: a pressing member 220 provided with a concave recess A at a position corresponding to the fixing nip 201; and a heater 300 provided in the recess A.

Figure 3A:
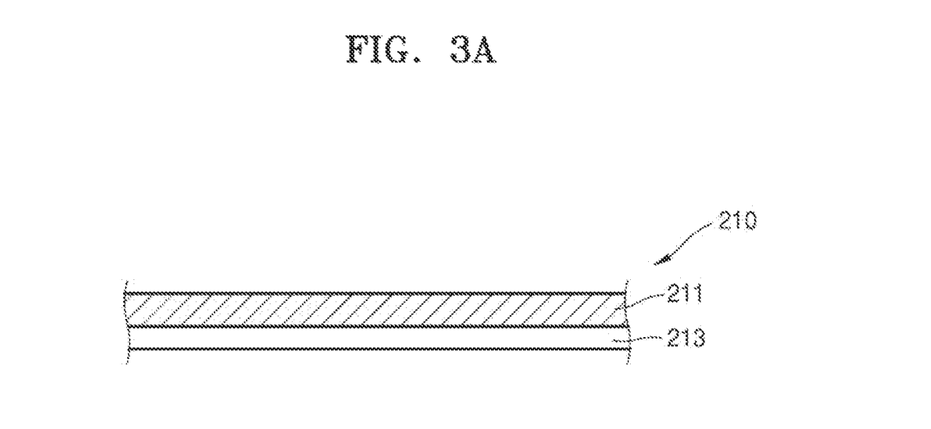
FIG. 3A is a cross-sectional view of an example of an endless belt according to an example of the disclosure.

FIG. 3A is a cross-sectional view illustrating an example of the endless belt 210 used as a fixing belt. Referring to FIG. 3A, the endless belt 210 may include a substrate layer 211 in the form of a film. The substrate layer 211 has a structure including: a first base resin; and a first thermally conductive filler dispersed in the first base resin. The first base resin may be at least one polymer having excellent heat resistance and abrasion resistance selected from polyimides (PI), polyamides (PA), and polyamideimides (PAI). The first base resin may be one selected from these polymers or a blend of two or more of these polymers. These polymers may have heat resistance that enables these polymers to endure a fixing temperature of, for example, about 120° C. to about 200° C. and abrasion resistance. The first thermally conductive filler may be at least one selected from carbon black, graphite, boron nitride (BN), carbon nanotubes (CNTs), and carbon fibers. The first thermally conductive filler may have a particle shape or a fibrous shape, and may have a large aspect ratio to increase thermal conductivity. For example, the first thermally conductive filler may include carbon fibers having an average length of about 6 μm or more in an amount of about 30 parts by weight to about 50 parts by weight with respect to 100 parts by weight of the first base resin. To improve bending resistance of the substrate layer 211, the amount of the first thermally conductive filler may be adjusted to about 40 parts by weight or less.

The first thermally conductive filler may include carbon fibers having an average length of about 7 μm or more in an amount of about 30 parts by weight to about 50 parts by weight based on 100 parts by weight of the first base resin. The first thermally conductive filler may include carbon fibers having an average length of about 8 μm or more in an amount of 30 parts by weight to about 50 parts by weight with respect to 100 parts by weight of the first base resin. An upper limit of the average length of the carbon fibers is not particularly limited, but may vary depending on commercial availability. The upper limit of the average length of the carbon fibers may be, for example, about 100 μm or less, for example, about 50 μm or less, about 40 μm or less, about 30 μm or less, about 20 μm or less, about 15 μm or less, about 14 μm or less, about 13 μm or less, about 12 μm or less, about 11 μm or less, or about 10 μm or less. By adjusting the amount and average length of the first thermally conductive filler within the above-described ranges, the substrate layer 211 may have a thermal conductivity in a thickness direction of about 1.5 W/m·K or more, for example, about 1.8 W/m·K or more. The cartoon fibers may be, for example, vapor grown carbon fibers (VGCFs).

The thickness of the substrate layer 211 may be selected to have flexibility and elasticity sufficient to enable the endless belt 210 to be flexibly deformed in the fixing nip 201 and to be restored to its original state after escaping from the fixing nip 210. For example, the substrate layer 211 may have a thickness of about 30 μm to about 200 μm, for example, about 75 μm to about 100 μm or about 50 μm to about 100 μm.

When the first base resin of the substrate layer 211 is a polyimide, the substrate layer 211 may be formed using, for example, the following method. First, a dianhydride compound and a diamine compound are allowed to react to obtain a polyamic acid. Non-limiting examples of suitable dianhydride compounds include pyromellitic dianhydride (PMDA), 3,3',4,4'-biphenyltetracarboxylic dianhydride, 4,4'-hexafluoroisopropylidene bis(phthalic anhydride), 4,4', 5,5'-sulfonyldiphthalic anhydride, 3,3',4,4'-benzophenonetetracarboxylic dianhydride, and 3,3',4,4'-oxydiphthalic anhydride. Non-limiting examples of suitable diamine compounds include p-phenylene diamine (p-PDA), m-phenylene diamine, 4,4'-oxydianiline (ODA), 4,4'-methylene diamine, and 4,4'-diaminophenyl sulfone. The polyamic acid may be obtained by reaction between the dianhydride compound and the diamine compound in a stoichiometric ratio of about 0.9 to 1: about 0.9 to 1 at a relatively low temperature, for example, at room temperature. The reaction may be carried out in dipolar aprotic amide solvents such as dimethylacetamide (DMAc) and N-methyl-2-pyrrolidone (NMP). Next, a first thermally conductive filler such as carbon fibers is dispersed in the polyamic acid by roll milling to obtain a dispersion. The quantitative relationship between both materials may be adjusted within the above-described ranges. Examples of a dispersion method include, but are not limited to, rotation milling in which milling is performed by placing a target to be dispersed in a container along with milling beads and rotating the target using a dispersion rotor, and roll milling, e.g., three-roll milling in which a target to be dispersed is milled using three rolls, i.e., a feed roll, a center roll, and an apron roll, that rotate while being engaged with one another. When the rotation milling method is used, a rotational force applied to the milling beads is too strong, so that the length of the first thermally conductive filler may be shortened. In this case, it may adversely affect the formation of a thermally conductive path or a thermally conductive network in the substrate layer 211. In this case, it may adversely affect an increase in the thermal conductivity of the substrate layer 211. When the three-roll milling method is used, a physical force applied to the first thermally conductive filler may be minimized, thereby minimizing the shortening of the length thereof, and thus the thermal conductivity of the substrate layer 211 may be enhanced.

Subsequently, the resulting dispersion may be formed into a film, and then the film may be heated at a temperature ranging from about 300° C. to about 380 20 C., for example, about 320° C. to about 370° C., about 330° C. to about 360° C., about 340° C. to about 355° C., or about 340° C. to about 350° C. to cause imidization cyclization, thereby obtaining the polyimide substrate layer 211.

When the polyimide substrate layer 211 including the first thermally conductive filler is used, excellent bending resistance and excellent crack resistance may be obtained, and thus the lifespan of the fixing belt may be increased, and a thermally conductive path or network may also be efficiently formed by the first thermally conductive fillers, thus achieving high thermal conductivity.

The outermost layer of the endless belt 210 may be a release layer 213. In a fixing process, toner on the recording medium P is melted, and thus an offset phenomenon, in which the toner is attached to the endless belt 210, may occur. The offset phenomenon may cause a printing failure such that a portion of a printed image on the recording medium P is missed, and cause a jam in which the recording medium P that has escaped from the fixing nip 201 is not separated from the endless belt 210 and is attached to an outer surface of the endless belt 210. The release layer 213 may be a heat-resistant resin layer having excellent separability to prevent the offset phenomenon. The release layer 213 may include, for example, at least one fluorine resin selected from the group consisting of a copolymer of tetrafluoroethylene and perfluoroether, which is also referred to as perfluoroalkoxy (PFA); polytetrafluoroethylene (PTFE); and a copolymer of tetrafluoroethylene and hexafluoropropylene, which is also referred to as fluorinated ethylene propylene (FEP). These fluorine resins may be used alone or as a blend of two or more of these fluorine resins may be used. The release layer 213 may be formed by covering the substrate layer 211 by a tube made of the above-described material or coating the surface of the substrate layer 211 with the above-described material. The release layer 213 may have a thickness of, for example, about 10 µm to about 30 µm.

Figure 3B:
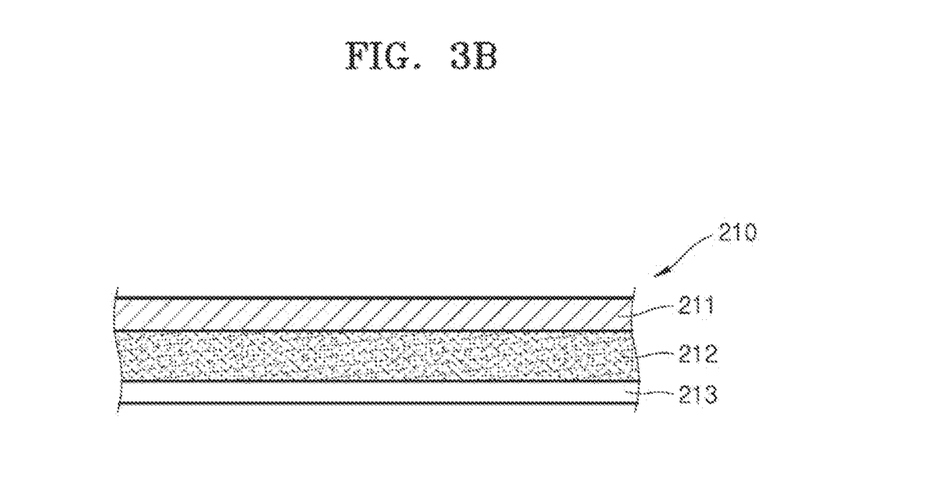
FIG. 3B is a cross-sectional view of another example of the endless belt according to an example of the disclosure.

As illustrated in FIG. 3B, the endless belt 210 according to an example of the present disclosure may further include an elastic layer 212 between the substrate layer 211 and the release layer 213. The elastic layer 212 facilitates formation of the fixing nip 201 that is relatively wide and smooth. When a fixing belt including the elastic layer 212 is used, the image quality of a printed material may be enhanced. Thus, the fixing belt including the elastic layer 212 is often used in imaging apparatuses for color image formation. The elastic layer 212 may be formed of a heat-resistant material that is able to endure a fixing temperature. The elastic layer 212 may include a second base resin and a second thermally conductive filler dispersed in the second base resin. The second base resin may include at least one elastic resin selected from the group consisting of a fluorine-containing rubber, a silicone rubber, natural rubber, isoprene rubber, butadiene rubber, nitrile rubber, chloroprene rubber, butyl rubber, acrylic rubber, hydrin rubber, a urethane rubber, a polystyrene-based resin, a polyolefin resin, a polyvinyl chloride-based resin, a polyurethane resin, a polyester resin, a polyamide resin, a polybutadiene-based resin, trans-polyisoprene-based resin, and a chlorinated polyethylene-based resin. The elastic resin may be an elastic rubber or a thermoplastic elastomer having thermal resistance that is able to endure a fixing temperature of, for example, about 120° C. to about 200° C. and abrasion resistance. The second base resin may be any one of the above-listed elastic resins, or a blend of two or more of these elastic resins.

The elastic layer 212 may include a second thermally conductive filler dispersed in the second base resin. The second thermally conductive filler may be at least one selected from silicon carbide (SiC), silicon nitride ($Si_3N_4$), boron nitride (BN), aluminum nitride (AlN), alumina ($Al_2O_3$), zinc oxide (ZnO), magnesium oxide (MgO), silica ($SiO_2$), copper (Cu), aluminum (Al), silver (Ag), iron (Fe), nickel (Ni), carbon black, graphite, carbon nanotubes (CNTs), and carbon fibers. The second thermally conductive filler may have a particle shape or a fibrous shape, and may have a large aspect ratio to increase thermal conductivity. For example, in terms of bending resistance and thermal conductivity, the second thermally conductive filler may include about 60 parts by weight to about 70 parts by weight of SiC, about 0 parts by weight to about 10 parts by weight of BN, and about 0.5 parts by weight to about 5 parts by weight, for example, about 2 parts by weight to about 4 parts by weight or about 2 parts by weight to about 3 parts by weight of carbon fibers having an average length of about 6 µm or more, with respect to 100 parts by weight of the second base resin. The second thermally conductive filler may include carbon fibers having an average length of about 7 µm or more in an amount of about 0.5 parts by weight to about 5 parts by weight, for example, about 2 parts by weight to about 4 parts by weight or about 2 parts by weight to about 3 parts by weight, with respect to 100 parts by weight of the second base resin. To increase the thermal conductivity of the elastic layer 212, a large amount of the second thermally conductive filler needs to be mixed. However, when the amount of the second thermally conductive filler is increased, adhesion between the substrate layer 211 and the elastic layer 212 and adhesion between the elastic layer 212 and the release layer 213 may be reduced, or the binding strength of the elastic layer 212 itself becomes weaker, thus reducing the lifespan of the fixing belt.

For example, the second thermally conductive filler may include carbon fibers having an average length of about 8 µm or more in an amount of about 0.5 parts by weight to about 5 parts by weight, for example, about 2 parts by weight to about 4 parts by weight or about 2 parts by weight to about 3 parts by weight, with respect to 100 parts by weight of the second base resin. Although not particularly limited, an upper limit of the average length of the carbon fibers may be restricted in accordance with commercial availability. The upper limit of the average length of the carbon fibers may be, for example, about 100 µm or less, for example, about 50 µm or less, about 40 µm or less, about 30 µm or less, about 20 µm or less, about 15 µm or less, about 14 µm or less, about 13 µm or less, about 12 µm or less, about 11 µm or less, or about 10 µm or less. By adjusting the amount and average length of the second thermally conductive filler within the above-described ranges, the elastic layer 212 may have a thermal conductivity in a thickness direction of about 1.3 W/m·K or more, for example, about 1.4 W/m·K or more, about 1.5 W/m·K or more, or about 1.6 W/m·K or more. The carbon fibers may be, for example, vapor grown carbon fibers (VGCFs).

The thickness of the elastic layer 212 may be selected to have flexibility and elasticity sufficient to enable the endless belt 210 to be flexibly deformed in the fixing nip 201 and to be restored to its original state after escaping from the fixing nip 210. For example, the thickness of the elastic layer 212 may range from, for example, about 10 µm to about 300 µm, for example, about 50 µm to about 250 µm, about 70 µm to about 200 µm, about 60 µm to about 150 µm, about 70 µm to about 130 µm, or about 80 µm to about 120 µm in consideration of heat transfer to the recording medium P. By adjusting the amount and average length of the second thermally conductive filler within the above-described ranges, the elastic layer 212 may have a thermal conductivity in a thickness direction of about 1.3 W/m·K or more. The carbon fibers may be, for example, vapor grown carbon fibers (VGCFs). The substrate layer 211 and the elastic layer 212 may include a silane coupling agent to increase adhesion.

The heating unit 400 is located in the endless belt 210. The backup member 230 that faces the heating unit 400 is located outside the endless belt 210. The heating unit 400 and the backup member 230 press against each other with the endless belt 210 disposed therebetween. For example, a pressing force acting towards the backup member 230 may be applied, by a first pressing member, e.g., a spring 250, to opposite end portions of the heating unit 400 in a width direction perpendicular to a direction in which the endless belt 210 circulates. As illustrated in FIG. 2, the spring 250 may also press the heating unit 400 with a metal bracket 251 disposed therebetween. A pressing force acting towards the heating unit 400 may also be applied to the backup member 230 by a second pressing member, for example, a spring 231. The backup member 230 may drive the endless belt 210. For example, the backup member 230 may be a backup roller or a pressing roller configured such that an elastic layer is formed on an outer circumferential surface of a metallic core. The backup member 230 may rotate while pressing against the heating unit 400 with the endless belt 210 disposed therebetween, thereby driving the endless belt 210. The heating unit 400 forms the fixing nip 201 along with the backup member 230, and guides the endless belt 210 to be driven. A belt guide 240 may be further provided at an outer side of the fixing nip 201 so that the endless belt 210 can be smoothly driven. The belt guide 240 may be integrally formed with the heating unit 400, and may be a separate member from the heating unit 400.

The heating unit 400 includes a pressing member 220 configured to form the fixing nip 201 while facing the backup member 230; and a heater 300 configured to heat the endless belt 210 in the fixing nip 201. In other words, in the heating unit 400 of the example, the pressing member 220 configured to form the fixing nip 201 and the heater 300 are integrally formed. In addition, in the example, the heater 300 may be a flexible heater having elasticity.

Figure 4:
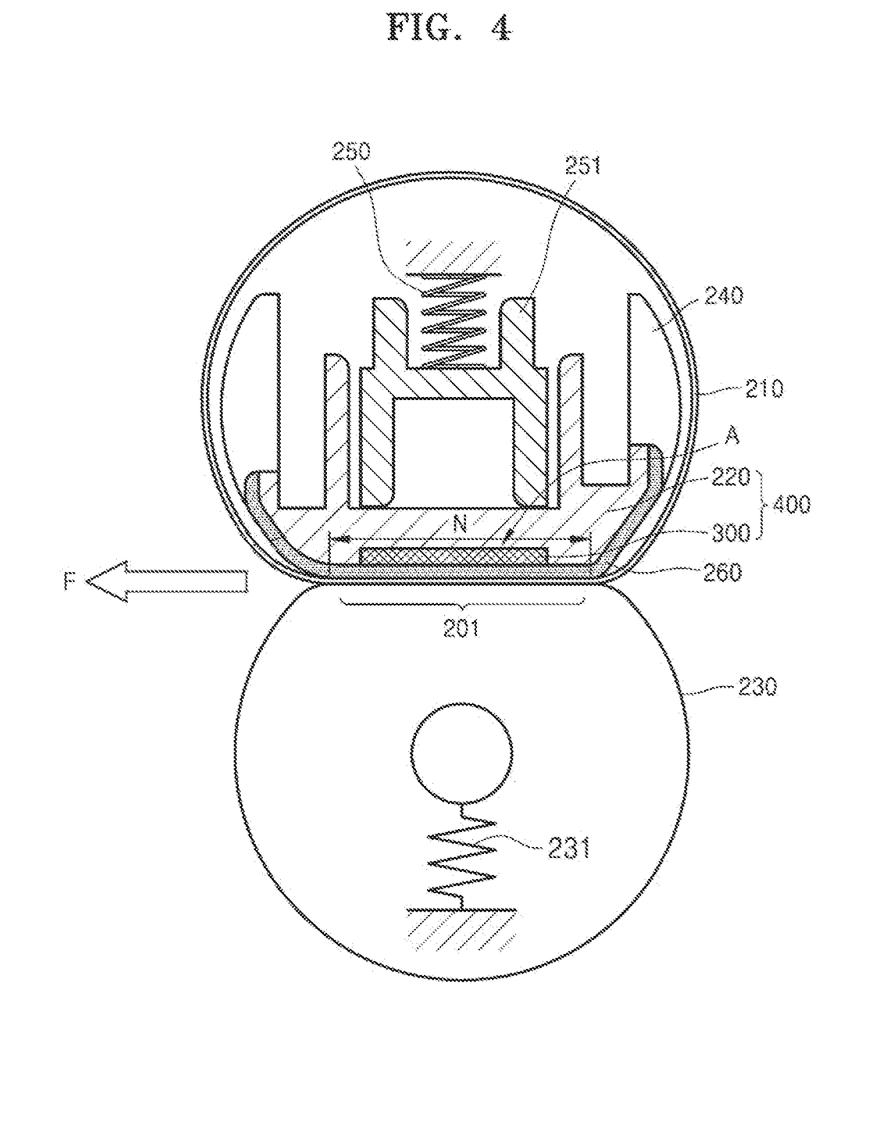
FIG. 4 is a cross-sectional view of a fixing device according to another example of the disclosure.

FIG. 4 is a cross-sectional view of a fixing device according to another example of the disclosure. The fixing device illustrated in FIG. 4 differs from the previous example in that a thermally conductive plate 260 is provided between the heater 300 and the endless belt 210. The thermally conductive plate 260 may be, for example, a thin metal plate. By placing the thermally conductive plate 260 between the heater 300 and the endless belt 210, heat of the heater 300 may be uniformly transferred to the belt 210. In addition, the width of the thermally conductive plate 260 may be adjusted to a width N or more of the fixing nip 201, thereby extending a range of heat transfer to the recording medium P, resulting in further enhanced fixability. In this case, a lubricant may be applied between the endless belt 210 and the thermally conductive plate 260.

The above described fixing belt has high thermal conductivity and excellent crack resistance, and thus a fixing device and an imaging apparatus each employing the fixing belt may be efficiently used in high-speed printing and low-energy fixing methods.

Hereinafter, the disclosure will be described in further detail with reference to the following comparative examples and examples. However, these examples are provided for illustrative purposes and are not intended to limit the scope of the disclosure.

COMPARATIVE EXAMPLES 1 TO 9

Formation of Substrate Layers

An NMP solution (solid content: about 70 wt %) of polyimide precursors was prepared such that mixing amounts of pyromellitic dianhydride (PMDA), p-phenylene diamine (p-PDA), and 4,4'-oxydianiline (ODA) were adjusted to about 1:0.5:0.5 (PMDA:p-PDA:ODA) on a molar ratio basis. The precursor solution was allowed to react at room temperature while being stirred, and then filtered, thereby obtaining a polyamic acid polymer.

Each of thermally conductive fillers having types and amounts with respect to 100 parts by weight of the polyamic acid polymer, as shown in Table 1 below, was added to the polyamic acid polymer. The resulting mixture was placed in a rotation mill and the filler was fully and homogeneously dispersed therein. At this time, zirconium (Zr) beads having a diameter of about 0.8 mm were used, and a rotation speed of a dispersion rotor was adjusted to about 600 rpm.

Each dispersion was uniformly coated onto a mold to a thickness of about 50 μm to about 100 μm, followed by heat treatment at a temperature of about 300° C. for about 2 hours to 3 hours to cause an imidization reaction, to thereby obtain a substrate layer. The obtained polyimide is denoted as PI ①.

In Table 1, carbon black is composed of particles having a mean particle diameter of about 48 nm, graphite is composed of particles having a mean particle diameter of about 8 μm, BN is composed of particles having a mean particle diameter of about 4 μm, CNT is composed of particles having a mean particle diameter of about 100 nm, VGCF-H (manufacturer: Showa Denko K.K.) refers to vapor grown carbon fibers having an average length of about 6 μm, and VGCF (manufacturer: Showa Denko K.K.) refers to vapor grown carbon fibers having an average length of about 8 μm. "phr" refers to parts by weight of the added thermally conductive filler, with respect to 100 parts by weight of the polyimide resin.

COMPARATIVE EXAMPLE 10

Formation of Substrate Layer

A polyamic acid polymer was prepared in the same manner as in Comparative Examples 1 to 9. Vapor grown carbon fibers (manufacturer: Showa Denko K.K. Model name: VGCF-H) having an average length of about 6 μm as shown in Table 1 below was added in an amount of 40 parts by weight with respect to 100 parts by weight of the polyamic acid polymer. The resulting mixture was placed in a 3-roll kneader to sufficiently and homogenously disperse the carbon fibers.

The resulting dispersion of PI ① and VGCF-H was molded into a cylindrical sleeve having a thickness of about 50 μm to about 100 μm, followed by heat treatment at a temperature of about 300° C. for about 2 hours to 3 hours to cause an imidization reaction, to thereby obtain a substrate layer.

EXAMPLES 1 TO 4

Formation of Substrate Layers

Each of vapor grown carbon fibers having an average length of about 8 μm (Manufacturer: Showa Denko K.K., Model name: VGCF) was added in an amount as shown in Table 1 below with respect to 100 parts by weight of a polyamic acid polymer. The resulting mixture was placed in a 3-roll kneader to sufficiently and homogeneously disperse the carbon fibers.

The resulting dispersion of PI and VGCF was molded into a cylindrical sleeve having a thickness of about 50 μm to about 100 μm, followed by heat treatment at a temperature of about 300° C. for 2 hours to 3 hours to cause an imidization reaction, to thereby obtain a substrate layer.

In Table 1, the polyimide type PI ① refers to a polyimide obtained using a polyamic acid polymer prepared in the same manner as in Comparative Examples 1 to 9, and the polyimide type PI ② refers to a polyimide obtained from a polyamic acid polymer obtained using polyimide precursors prepared such that mixing amounts of PMDA and ODA are adjusted to about 1:1 (PMDA:ODA).

TABLE 1

| | First thermally conductive filler (phr) | | | | | Dispersion method | Polyimide type Polyimide type | Thermal diffusivity (mm²/s) 0.46 | Thermal conductivity (W/m · K) 0.653 |
|---|---|---|---|---|---|---|---|---|---|
| | Carbon black | Graphite | BN | CNT | VGCF-H (average length of 6 μm) | VGCF (average length of 8 μm) | | | |
| Comparative Example 1 | 30 | — | — | — | — | — | Rotation milling | PI ① | 0.46 | 0.653 |
| Comparative Example 2 | — | 30 | — | — | — | — | Rotation milling | PI ① | 0.396 | 0.589 |
| Comparative Example 3 | — | — | 30 | — | — | — | Rotation milling | PI ① | 0.473 | 0.658 |
| Comparative Example 4 | 20 | 30 | — | — | — | — | Rotation milling | PI ① | 0.66 | 0.885 |
| Comparative Example 5 | — | — | 50 | — | — | — | Rotation milling | PI ① | 0.984 | 1.379 |
| Comparative Example 6 | 10 | 30 | — | 5 | — | — | Rotation milling | PI ① | 0.637 | 0.916 |
| Comparative Example 7 | — | — | — | — | 30 | — | Rotation milling | PI ① | 0.647 | 0.881 |
| Comparative Example 8 | — | — | — | — | 40 | — | Rotation milling | PI ① | 0.824 | 1.108 |
| Comparative Example 9 | — | — | — | — | 50 | — | Rotation milling | PI ① | 0.978 | 1.308 |
| Comparative Example 10 | — | — | — | — | 40 | — | 3-roll mixing | PI ① | 1.011 | 1.354 |
| Example 1 | — | — | — | — | — | 30 | 3-roll mixing | PI ② | 1.128 | 1.532 |
| Example 2 | — | — | — | — | — | 40 | 3-roll mixing | PI ① | 1.464 | 2.017 |
| Example 3 | — | — | — | — | — | 35 | 3-roll mixing | PI ② | 1.43 | 1.956 |
| Example 4 | — | — | — | — | — | 40 | 3-roll mixing | PI ② | 1.56 | 2.121 |

From the results shown in Table 1, the following results can be confirmed.

First, it was more effective in obtaining a substrate with high thermal conductivity in the case in which carbon fibers having a large aspect ratio were used as the thermally conductive filler of the substrate layer than in the case in which other fillers were used. Among these carbon fibers, the thermal conductivity in a thickness direction of the obtained substrate layer was higher when VGCF having an average length of about 8 μm were used, than when VGCF-H having an average length of about 6 μm was used. For example, when the results of the cases of Comparative Example 10 and Example 2, in which the amounts of the used carbon fibers were the same, i.e., 40 phr, were compared with each other, the thermal conductivity of the case of Example 2 using the carbon fiber filler having an average length of about 8 μm was remarkably increased by about 48.9% (1:354 W/m·K→2.017 W/m·K), as compared to that of the case of Comparative Example 10 using the carbon fiber filler having an average length of about 6 μm.

Second, as a method of dispersing the filler, roll mixing is more suitable than rotation milling to obtain a substrate layer with high thermal conductivity. For example, when the results of Comparative Example 8 and Comparative Example 10, which are the same in that 40 phr of VGCF-H was used, were compared with each other, the thermal conductivity of the case of Comparative Example 10 using the roll mixing method was remarkably increased by about 22.2% (1.108 W/m·K→1.354 W/m·K), as compared to that of the case of Comparative Example 8 using the rotation milling method. A cause of the occurrence of such a difference may be assumed as follows. In the case of the rotation milling method, bead particles used in dispersion apply a strong physical force to carbon fibers such that the carbon fibers are cut, and thus the average length of the carbon fibers remaining in the substrate layer is finally reduced. In the case of roll mixing such as 3-roll mixing, carbon fibers are dispersed in a relatively mild manner through a physical force acting when passing through a nip between rolls without using bead particles, and thus cutting of the carbon fibers may be minimized. Accordingly, it is suitable to satisfactorily form a thermally conductive path or network in the obtained substrate layer, thereby obtaining high thermal conductivity.

In the case of Examples 1 to 4, 3-roll mixing was used and the average length and amount of the used carbon fibers were satisfactorily adjusted, thereby achieving high thermal conductivity in a thickness direction of the substrate layer, i.e., about 1.5 W/m·K or more, especially about 1.8 W/m·K or more, and in some cases, about 1.9 W/m·K or more. When such a polyimide substrate layer with high thermal conductivity is used, a fixing belt that has high thermal conductivity and thus may be efficiently used in high-speed printing and low-energy fixing methods may be manufactured.

When carbon fibers having an average length of about 6 μm are used, higher thermal conductivity may be obtained as compared to when carbon black, graphite, CNTs, and BN were used, but it is difficult to obtain sufficiently high thermal conductivity unless the amount of carbon fibers is increased. For example, in the case of Comparative Examples 5 and 9 in which 50 phr of BN or 50 phr of VGCF-H, although the amount of the filler was very large, thermal conductivity was less than 1.4 W/m·K. When the filler is used in such a large amount, the substrate layer becomes brittle, resulting in poor bending resistance and poor crack resistance. In this aspect, the amount of the filler may be maintained at about 40 phr or less.

Third, both PI ① and PI ② as base resins of the respective substrate layers exhibited satisfactory thermal conductivity. In terms of the capability of the substrate layer to increase tensile strength, tensile elongation, and toughness, PI ② is more excellent than PI ①.

Figure 5:
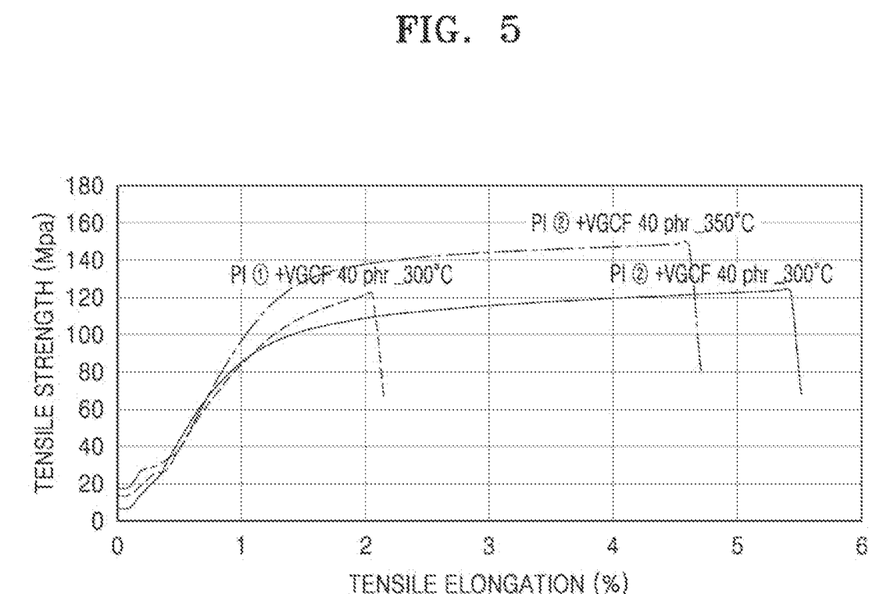
FIG. 5 are graphs showing summarized results of tensile tests performed on a substrate layer obtained in Example 2 (PI ①+VGCF 40 phr_300° C.), a substrate layer obtained in Example 4 (PI ②+VGCF 40 phr_300° C.), and a substrate layer obtained in the same manner as in Example 4, except that a heat treatment temperature for imidization was raised to 350° C. (PI ②+VGCF 40 phr_350° C.).

FIG. 5 are graphs showing summarized tensile test results of a substrate layer obtained in Example 2 (PI ①+VGCF 40 phr_300° C.), a substrate layer obtained in Example 4 (PI ②+VGCF 40 phr_300° C.), and a substrate layer obtained in the same manner as in Example 4, except that a heat treatment temperature for imidization was raised to 350° C. (PI ②+VGCF 40 phr_350° C.). The graphs of FIG. 5 show results obtained using a universal testing machine (Manufacturer: Instron, Model name: 5542A) under conditions of room temperature and a crosshead speed of 5 mm/sec.

Referring to FIG. 5, it can be seen that the substrate layer of Example 4 (PI ②+VGCF 40 phr_300° C.) exhibited tensile strength similar to that of the substrate layer of Example 2 (PI ①+VGCF 40 phr_300° C.), while exhibiting significantly increased tensile elongation and toughness. Thus, the bending resistance, crack resistance, and lifespan of a fixing belt using the substrate layer of Example 4 formed using PI ② may be significantly increased as compared to those of a fixing belt using the substrate layer of Example 2 formed using PI ①. The substrate layer (PI ②+VGCF 40 phr_350° C.) obtained by raising the heat treatment temperature for imidization to 350° C. exhibited a much higher tensile strength than that of the substrate layer of Example 4. Thus, the abrasion resistance, bending resistance, crack resistance, and lifespan of a fixing belt using this substrate layer may be significantly increased, as compared to those of the fixing belt using the substrate layer of Example 4.

In Table 1, the thermal diffusivity indicates values measured using thermal diffusion measurement equipment (Laser Flash Apparatus (LFA)) (manufacturer: NETZSCH, Model name: LFA 467). The thermal conductivity indicates values obtained by measuring the specific heat of each substrate layer using Ultra Low Temp Differential Scanning Calorimetry (Manufacturer: NETZSCH, Model name: DSC 214 Polyma), and then multiplying the specific heat value by the obtained thermal diffusivity value. That is, the thermal conductivity satisfies the following equation: thermal conductivity in thickness direction=specific heat×thermal diffusivity.

COMPARATIVE EXAMPLES 11 TO 16 AND EXAMPLES 5 TO 7

Formation of Elastic Layers

Each of thermally conductive fillers having types and amounts with respect to 100 parts by weight of an addition-cure silicone rubber stock solution, as shown in Table 2 below, was added to the stock solution. The filler was sufficiently and homogenously dispersed in the resulting mixture.

The obtained dispersion was molded, on a glass plate, into a film form having a thickness of about 0.3 mm, followed by heat treatment at a temperature of about 200° C. for about 1 hour, to thereby obtain a silicone rubber elastic layer.

In Table 2, BN, CNT, VGCF-H, and VGCF refer to the same thermally conductive fillers as those described in Table 1, $Al_2O_3$ refers to particles having a mean particle diameter of about 1 μm, and SiC refers to silicon carbide particles having a mean particle diameter of about 5 μm. In Table 2, "phr" denotes parts by weight of the added thermally conductive filler with respect to 100 parts by weight of the silicone rubber resin prepared from the silicone rubber stock solution.

TABLE 2

|  | Second thermally conductive filler (phr) | | | | | | Thermal diffusivity (mm²/s) | Thermal conductivity (W/m · K) |
| --- | --- | --- | --- | --- | --- | --- | --- | --- |
|  | $Al_2O_3$ | SiC | CNT | BN | VGCF-H | VGCF | | |
| Comparative Example 11 | 65 | — | — | — | — | — | 0.435 | 0.932 |
| Comparative Example 12 | — | 60 | — | — | — | — | 0.354 | 0.71 |
| Comparative Example 13 | — | 65 | — | — | — | — | 0.363 | 0.815 |
| Comparative Example 14 | — | 70 | — | — | — | — | 0.482 | 1.15 |
| Comparative Example 15 | — | 65 | 0.5 | — | — | — | 0.412 | 0.921 |
| Comparative Example 16 | — | 65 | — | — | 3 | — | 0.649 | 1.131 |
| Example 5 | — | 65 | — | 9.5 | 2 | — | 0.741 | 1.321 |
| Example 6 | — | 67 | — | — | 3 | — | 0.803 | 1.425 |
| Example 7 | — | 60 | — | — | — | 3 | 0.88 | 1.63 |

Referring to Table 2, in the case of Examples 5 to 7 in which SiC, BN, and carbon fibers having an average length of about 6 μm or more were controlled to be included in amounts of about 60 parts by weight to 70 parts by weight, about 0 part by weight to 10 parts by weight, and about 0.5 parts by weight to 5 parts by weight, respectively, based on 100 parts by weight of the silicone rubber resin, each elastic layer exhibited a high thermal conductivity in a thickness direction of about 1.3 W/m·K or more, especially about 1.4 W/m·K or more, and in some cases, about 1.6 W/m·K or more. When such an elastic layer with high thermal conductivity is used, a fixing belt that has thermal conductivity and thus may be efficiently used in high-speed printing and low-energy fixing methods may be manufactured.

A fixing belt having high thermal conductivity may be manufactured by applying a silicone primer layer onto each of the substrate layers of Examples 1 to 3, and then applying the above-described general release layer thereonto and drying the resultant structure. By further forming an elastic layer between the substrate layer and the release layer in the same manner as in Examples 5 to 7, a fixing belt having higher thermal conductivity may be manufactured.

As a result of testing adhesion to the obtained fixing belts, it was confirmed that while separation occurred in the primer layer in each of the fixing belts obtained each using the substrate layer and the elastic layer according to the comparative examples when testing was performed about 200 times, the fixing belts obtained each using the substrate layer and the elastic layer according to the examples endured the testing even up to about 800 times. Upon observation of separation modes, it was confirmed that while separation occurred in the primer layers when the substrate layers and the elastic layers of the comparative examples were used, not the primer layers but the elastic layers themselves were separated when the substrate layers and the elastic layers of the examples were used. These results demonstrate that the elastic layers of the examples exhibit both excellent thermal conductivity and excellent adhesion.

From the above results, it can be seen that since a fixing belt according to the disclosure has high thermal conductivity, excellent bending resistance, and excellent crack resistance, a fixing device and an imaging apparatus each employing the fixing belt may be efficiently used in high-speed printing and low-energy fixing methods.

While examples of the disclosure have been described with reference to the accompanying drawings and examples, these examples are provided for illustrative purposes, and it will be understood by one of ordinary skill in the art to which the disclosure pertains that various modifications and other examples equivalent thereto may be made. Thus, the scope of the disclosure should be defined by the appended claims.

What is claimed is:

1. A fixing belt comprising:
   a substrate layer including a first base resin and a first thermally conductive filler dispersed in the first base resin, and
   a release layer,
      wherein the first base resin comprises at least one selected from a polyimide, a polyamide, and a polyamideimide,
      the first thermally conductive filler comprises at least one selected from carbon black, graphite, boron nitride (BN), carbon nanotubes (CNTs), and carbon fibers, and
      the substrate layer has a thermal conductivity of about 1.5 W/m·K or more in a thickness direction of the substrate layer.

2. The fixing belt of claim 1, further comprising an elastic layer between the substrate layer and the release layer, wherein
   the elastic layer comprises a second base resin and a second thermally conductive filler dispersed in the second base resin, and
   the elastic layer has a thermal conductivity of about 1.3 W/m·K or more in a thickness direction of the elastic layer.

3. The fixing belt of claim 2, wherein the second thermally conductive filler comprises at least one selected from silicon carbide (SiC), silicon nitride ($Si_3N_4$), boron nitride (BN), aluminum nitride (AlN), alumina ($Al_2O_3$), zinc oxide (ZnO), magnesium oxide (MgO), silica ($SiO_2$), copper (Cu), aluminum (Al), silver (Ag), iron (Fe), nickel (Ni), carbon black, graphite, carbon nanotubes (CNTs), and carbon fibers.

4. The fixing belt of claim 2, wherein the second thermally conductive filler comprises, based on 100 parts by weight of the second base resin,
   about 60 parts by weight to about 70 parts by weight of silicon carbide (SiC),
   about 0 parts by weight to about 10 parts by weight of boron nitride (BN), and
   about 0.5 parts by weight to about 5 parts by weight of carbon fibers having an average length of about 6 μm or more.

5. The fixing belt of claim 2, wherein the second base resin comprises at least one elastic resin selected from the group consisting of a fluorine-containing rubber, a silicone rubber, natural rubber, isoprene rubber, butadiene rubber, nitrile rubber, chloroprene rubber, butyl rubber, acrylic rubber, hydrin rubber, a urethane rubber, a polystyrene-based resin, a polyolefin resin, a polyvinyl chloride-based resin, a polyurethane resin, a polyester resin, a polyamide resin, a polybutadiene-based resin, a trans-polyisoprene-based resin, and a chlorinated polyethylene-based resin.

6. The fixing belt of claim 2, wherein the substrate layer and the elastic layer comprise a silane coupling agent.

7. The fixing belt of claim 1, wherein
   the first thermally conductive filler comprises the carbon fibers having an average length of about 6 μm or more, in an amount of about 30 parts by weight to about 50 parts by weight with respect to 100 parts by weight of the first base resin.

8. The fixing belt of claim 1, wherein the release layer comprises at least one fluorine resin selected from the group consisting of a copolymer (PFA) of tetrafluoroethylene and perfluoroether, polytetrafluoroethylene (PTFE), and a copolymer of tetrafluoroethylene and hexafluoropropylene.

9. The fixing belt of claim 1, wherein the substrate layer is formed using a method comprising:
   dispersing carbon fibers in a polyamic acid by roll milling to obtain a dispersion; and
   heating the dispersion at a temperature of about 300° C. to about 380° C. to induce an imidization reaction, thereby obtaining a polyimide.

10. The fixing belt of claim 1, wherein the fixing belt is to fix a toner image on a recording medium.

11. A fixing device comprising:
   a rotatable endless belt;
   a backup member provided outside the endless belt to be in contact with the endless belt, to drive the endless belt; and
   a heating unit provided inside the endless belt, to form a fixing nip while facing toward the backup member and heat the endless belt in the fixing nip, wherein
   the heating unit comprises:
      a pressing member having a concave recess at a position corresponding to the fixing nip; and
      a heater provided in the concave recess, and
   the endless belt comprises:
      a substrate layer comprising a first base resin and a first thermally conductive filler dispersed in the first base resin; and
      a release layer,
   the first base resin comprises at least one selected from a polyimide, a polyamide, and a polyamideimide,
   the first thermally conductive filler comprises at least one selected from carbon black, graphite, boron nitride (BN), carbon nanotubes (CNT), and carbon fibers, and
   the substrate layer has a thermal conductivity of about 1.5 W/m·K or more in a thickness direction of the substrate layer.

12. The fixing device of claim 11, wherein
   the endless belt comprises an elastic layer between the substrate layer and the release layer, the elastic layer comprises a second base resin and a second thermally conductive filler dispersed in the second base resin, and the elastic layer has a thermal conductivity of about 1.3 W/m·K or more in a thickness direction of the elastic layer.

13. The fixing device of claim 12, wherein the backup member is a backup roller.

14. An imaging apparatus comprising:
a printing unit to form a toner image on a recording medium; and
a fixing device to fix the toner image on the recording medium,
wherein the fixing device comprises:
a rotatable endless belt;
a backup member provided outside the endless belt to be in contact with the rotatable endless belt, to drive the endless belt; and
a heating unit provided inside the endless belt, the heating unit to form a fixing nip while facing toward the backup member and heat the endless belt in the fixing nip, wherein
the heating unit comprises:
a pressing member having a concave recess at a position corresponding to the fixing nip, and
a heater provided in the concave recess, and the endless belt comprises:
a substrate layer comprising a first base resin and a first thermally conductive filler dispersed in the first base resin, and
a release layer,
the first base resin comprises at least one selected from a polyimide, a polyamide, and a polyamideimide,
the first thermally conductive filler comprises at least one selected from carbon black, graphite, boron nitride (BN), carbon nanotubes (CNT), and carbon fibers, and
the substrate layer has a thermal conductivity of about 1.5 W/m·K or more in a thickness direction of the substrate layer.

15. The imaging apparatus of claim 14, wherein the endless belt comprises an elastic layer between the substrate layer and the release layer, the elastic layer comprises a second base resin and a second thermally conductive filler dispersed in the second base resin, and the elastic layer has a thermal conductivity of about 1.3 W/m·K or more in a thickness direction of the elastic layer.

* * * * *